US012084528B2

(12) United States Patent
Watanabe et al.

(10) Patent No.: US 12,084,528 B2
(45) Date of Patent: Sep. 10, 2024

(54) PHOTOCURABLE RESIN COMPOSITION AND RESIN CURED PRODUCT

(71) Applicant: NAGASE CHEMTEX CORPORATION, Osaka (JP)

(72) Inventors: Koji Watanabe, Tatsuno (JP); Yoshiyuki Yamaguchi, Tatsuno (JP); Hiroaki Ozoe, Tatsuno (JP)

(73) Assignee: NAGASE CHEMTEX CORPORATION, Osaka (JP)

( * ) Notice: Subject to any disclaimer, the term of this patent is extended or adjusted under 35 U.S.C. 154(b) by 633 days.

(21) Appl. No.: 17/291,939

(22) PCT Filed: Nov. 1, 2019

(86) PCT No.: PCT/JP2019/043089
§ 371 (c)(1),
(2) Date: May 6, 2021

(87) PCT Pub. No.: WO2020/095846
PCT Pub. Date: May 14, 2020

(65) Prior Publication Data
US 2022/0002447 A1    Jan. 6, 2022

(30) Foreign Application Priority Data
Nov. 7, 2018 (JP) .................. 2018-209914

(51) Int. Cl.
*C08F 2/48* (2006.01)
*C08F 299/06* (2006.01)

(52) U.S. Cl.
CPC .............. *C08F 2/48* (2013.01); *C08F 299/06* (2013.01)

(58) Field of Classification Search
CPC .. C08F 4/28; C08F 4/50; C08F 299/06; C08F 299/065
(Continued)

(56) References Cited

U.S. PATENT DOCUMENTS

| 5,314,962 A | 5/1994 | Otsu et al. |
| 11,485,865 B2 * | 11/2022 | Steeman ............. C08F 290/061 |

(Continued)

FOREIGN PATENT DOCUMENTS

| DE | 102004039982 A1 * | 2/2006 | ............. C08F 297/04 |
| EP | 3315292 A1 * | 5/2018 | ........... B29C 64/106 |

(Continued)

OTHER PUBLICATIONS

Decision of Refusal in corresponding JP application No. 2020-519151 dated Jul. 7, 2021, 5 pages.
(Continued)

*Primary Examiner* — Sanza L. McClendon
(74) *Attorney, Agent, or Firm* — NIXON & VANDERHYE P.C.

(57) ABSTRACT

A photocurable resin composition includes: a first reactive compound that forms a glass phase through curing; a second reactive compound that is compatible with the first reactive compound and forms a rubber phase through curing; and a photopolymerization initiator. The first reactive compound includes at least a reactive monomer, and the second reactive compound includes at least a reactive oligomer. A polar term $dP_1$ of Hansen Solubility Parameter of the first reactive compound and a polar term $dP_2$ of Hansen Solubility Parameter of the second reactive compound differ by 1.8 or more.

15 Claims, 2 Drawing Sheets

(58) Field of Classification Search
USPC .................................................... 522/96, 97
See application file for complete search history.

(56) References Cited

U.S. PATENT DOCUMENTS

| | | | |
|---|---|---|---|
| 2008/0302479 A1 | 12/2008 | Barker et al. | |
| 2010/0162657 A1 | 7/2010 | Swei et al. | |
| 2018/0037758 A1* | 2/2018 | Ishikawa | B29C 64/209 |
| 2019/0040182 A1 | 2/2019 | Miyatake | |
| 2022/0002447 A1* | 1/2022 | Watanabe | C08F 299/06 |

FOREIGN PATENT DOCUMENTS

| | | | | |
|---|---|---|---|---|
| JP | S64-26619 | | 1/1989 | |
| JP | H08-59760 | | 3/1996 | |
| JP | 2009-519368 | | 5/2009 | |
| JP | 2012-513553 | | 6/2012 | |
| JP | 2012111226 A * | | 6/2012 | ........... B29C 64/112 |
| JP | 2015-168819 | | 9/2015 | |
| JP | 2016-35055 | | 3/2016 | |
| JP | 2016-112824 | | 6/2016 | |
| JP | 2016112823 A * | | 6/2016 | |
| JP | 2017-82128 | | 5/2017 | |
| JP | 2018-17967 | | 2/2018 | |
| JP | 2018-30930 | | 3/2018 | |
| JP | 6451287 B2 * | | 1/2019 | |
| JP | 6451288 B2 * | | 1/2019 | |
| JP | 2019-56044 | | 4/2019 | |
| JP | 2019051679 A * | | 4/2019 | |
| JP | 2019-99649 | | 6/2019 | |
| WO | 2016/143559 | | 9/2016 | |
| WO | 2017/179653 | | 10/2017 | |
| WO | WO-2018143305 A1 * | | 8/2018 | ........... B29C 64/112 |
| WO | WO-2020001835 A1 * | | 1/2020 | ........... B29C 64/124 |
| WO | WO-2020095846 A1 * | | 5/2020 | ................ C08F 2/48 |
| WO | WO-2020170990 A1 * | | 8/2020 | ........... B29C 64/129 |

OTHER PUBLICATIONS

Notice of Reasons for Refusal in corresponding JP application No. 2020-519151 dated May 26, 2021, 6 pages.
International Search Report for PCT/JP2019/043089 dated Jan. 21, 2020, 10 pages.
Written Opinion of the ISA for PCT/JP2019/043089 dated Jan. 21, 2020, 5 pages.

* cited by examiner

PHOTOCURABLE RESIN COMPOSITION AND RESIN CURED PRODUCT

This application is the U.S. national phase of International Application No. PCT/JP2019/043089 filed Nov. 1, 2019 which designated the U.S. and claims priority to JP Patent Application No. 2018-209914 filed Nov. 7, 2018, the entire contents of each of which are hereby incorporated by reference.

TECHNICAL FIELD

The present invention relates to a liquid photocurable resin composition for forming a resin cured product through curing by the action of light, and a resin cured product obtained through the curing.

BACKGROUND ART

With advancement of shaping technologies, such as 3D printing technologies, there has been developed photocurable resin compositions suited to use for optical shaping.

Patent Literature 1 discloses a resin composition for optical three-dimensional shaping. The resin composition includes: (A) a urethane (meth)acrylate oligomer obtained by reacting a specific diol, a diisocyanate, and a hydroxy group-containing (meth)acrylate; (B) a urethane (meth)acrylate oligomer obtained by reacting a diisocyanate and a hydroxy group-containing (meth)acrylate; (C) an ethylenic unsaturated monomer; and (D) a photopolymerization initiator.

CITATION LIST

Patent Literature

[PTL 1] Japanese Laid-Open Patent Publication No. H8-59760

SUMMARY OF INVENTION

Technical Problem

For optical shaping applications, a curable resin composition is required to be cured rapidly. When the curing rate is increased, however, distortion is likely to occur in a polymer obtained through curing, which tends to result in lower physical properties. Especially in the case of a liquid photocurable resin composition, distortion is more likely to occur in the polymer, resulting in lower toughness of the resin cured product. Using the resin composition of Patent Literature 1 can increase the toughness of the resin cured product to some extent, but this high toughness is due to its high flexibility, and the strength of the resin cured product is lowered.

Solution to Problem

One aspect of the present invention relates to a photocurable resin composition in a liquid state, including: a first reactive compound that forms a glass phase through curing; a second reactive compound that is compatible with the first reactive compound and forms a rubber phase through curing; and a photopolymerization initiator, wherein the first reactive compound includes at least a reactive monomer, the second reactive compound includes at least a reactive oligomer, and a polar term $dP_1$ of Hansen Solubility Parameter of the first reactive compound and a polar term $dP_2$ of Hansen Solubility Parameter of the second reactive compound differ by 1.8 or more.

Another aspect of the present invention relates to a resin cured product obtained by photocuring the above-mentioned photocurable resin composition.

Still another aspect of the present invention relates to a resin cured product having a phase separation structure of a glass phase and a rubber phase, wherein an Izod impact strength as measured in accordance with ASTM D256 is 100 J/m or more, and the glass phase has a glass transition point of 70° C. or higher.

Advantageous Effects of Invention

A liquid curable resin composition that can achieve both high strength and high toughness of resin cured products, and a resin cured product of the curable resin composition can be provided.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF EMBODIMENTS

For a photocurable resin composition used for shaping, such as optical shaping, not only physical properties of resin cured products, but also rapid curing, low contraction during curing, high accuracy in shape, and like are required. In addition, for optical shaping, a liquid photocurable resin composition has been increasingly used in recent years. When the curing rate is increased, however, especially in the case of a liquid photocurable composition, distortion is likely to occur in a polymer obtained through curing. The distortion tends to cause the polymer to be brittle, resulting in its lower toughness. In order to increase the toughness, it is necessary to increase the flexibility of the polymer, but this reduces the strength of the polymer.

In the field of ordinary thermoplastic molding materials, in view of achieving both toughness and strength, various techniques have been studied, such as a technique of alloying a plurality of polymer materials and a technique of dispersing rubber particles in a polymer material. The molding materials utilizing such techniques are suitably applicable for molding, such as injection molding. Such molding materials, however, are difficult to ensure reproducibility of superfine shape and shaping with high accuracy, and are not suited to use for shaping, such as optical shaping. Moreover, the rubber particles are likely to agglomerate and are difficult to be finely dispersed in a matrix, which makes it difficult to ensure high toughness. Furthermore, the material with rubber particles dispersed therein tends to be highly viscous, and when used in an inkjet-type shaping apparatus, tends to cause a print head jam due to the high viscosity and the agglomerated rubber particles.

[Photocurable Resin Composition]

A photocurable resin composition according to one aspect of the present invention is liquid, and includes a first reactive compound that forms a glass phase through curing, a second reactive compound that is compatible with the first reactive compound and forms a rubber phase through curing, and a photopolymerization initiator. The first reactive compound includes at least a reactive monomer, and the second reactive compound includes at least a reactive oligomer. Here, the polar term dP ($dP_1$) of Hansen Solubility Parameter (HSP) of the first reactive compound and the polar term dP ($dP_2$) of HSP of the second reactive compound differ by 1.8 or more.

When the photopolymerization initiator is activated by allowing light to act on the photocurable resin composition, of the reactive compounds, the reactive monomer, in which the reactive groups are likely to come in contact with each other due to its small molecular size, is cured rapidly, forming a glass phase. On the other hand, the reactive oligomer is cured slowly, forming a rubber phase. As the curing reaction of each reactive compound proceeds in this way, phase separation proceeds gradually into a glass phase and a rubber phase. The phase separation as above is due to a spinodal decomposition induced as the curing reactions proceed, and is commonly referred to as a reaction-induced phase separation. In the above aspect, the photocurable resin composition is liquid in a compatibilized state, and the first reactive compound and the second reactive compound differing in the polar term dP of HSP by 1.8 or more are used in combination. Therefore, the progress of the curing reactions through which the glass phase and the rubber phase are formed from the compatibilized state can be controlled, and optimized at the molecular level. This can form a phase separation structure that can provide both high strength due to the glass phase and high toughness due to the rubber phase. Thus, high strength and high toughness in a resin cured product of the photocurable resin composition can be achieved at the same time.

It is considered, in general, that in an alloy or blend of thermoplastic resin, high toughness can be achieved by finely dispersing rubber phases in nano sizes. In contrast, according to the above aspect, a resin cured product which is transparent, indicating that the rubber phases are finely dispersed, is low in toughness, and a resin cured product which is turbid in color, indicating that the rubber phases have grown large to some extent, is high in toughness. In other words, in the resin cured product of the photocurable resin composition, when the rubber phases are finely dispersed too much, the toughness decreases. Although the details of the mechanism of the increase and decrease of the toughness in the resin cured product of the photocurable resin composition are not yet certain, the behavior of the action that the phase separation structure exerts on the toughness is clearly different from that in the case of a thermoplastic resin.

The photocurable resin composition is liquid (i.e., has fluidity) at room temperature (specifically, at temperatures of 20° C. or higher and 35° C. or lower). Being liquid at room temperature, the photocurable resin composition is easily applicable for optical shaping using a 3D printer and the like. The viscosity of the photocurable resin composition at 25° C. is, for example, 5000 mPa·s or less, and may be 1000 mPa·s or less and may be 500 mPa·s or less. The viscosity of the photocurable resin composition at 25° C. may be 50 mPa·s or more.

In the present specification, the viscosity of the photocurable resin composition refers to a viscosity as measured, for example, using a cone-plate (E-type) viscometer at a rotation speed of 100 rpm.

The "reactive" as used in the first reactive compound and the second reactive compound means that the compound has a reactive group involved in a curing reaction utilizing a photopolymerization initiator.

The reactive compound includes a reactive monomer and a reactive oligomer. The reactive oligomer at least includes a moiety of repeating constituent monomer units (the number of repeating units: two or more), and is differentiated from the reactive monomer.

The first reactive compound forms a glass phase through curing. A resin cured product obtained by curing the first reactive compound has a glass transition point (Tg) of 0° C. or higher. The second reactive compound forms a rubber phase through curing. A resin cured product obtained by curing the second reactive compound has a Tg of lower than 0° C. The first reactive compound and the second reactive compound may be each one kind or two or more kinds of compounds. When the Tg of a resin cured product of the individual compound is 0° C. or higher, it is categorized as the first reactive compound, and when the Tg is lower than 0° C., it is categorized as the second reactive compound.

The Tg of the resin cured product of the reactive compound refers to a Tg as measured with respect to a resin cured product of one reactive compound using, for example, a commercially available dynamic viscoelasticity measuring apparatus (DMA). The Tg may be measured with respect to a resin cured product obtained by curing a reactive compound separated from the photocurable resin composition, or with respect to a resin cured product obtained by identifying the reactive compound from the photocurable resin composition, and curing a separately prepared identical compound. When an identical compound is not easily available, a compound having a similar structure thereto may be used to measure its Tg, which may be referred to as the above Tg of the resin cured product of the reactive compound. Also, the Tg of the resin cured product of the reactive compound can be determined from the Tg(s) of the resin cured product of the photocurable resin composition based on a peak (top peak) of the tanδ curve obtained by measuring the viscoelasticity, while elevating temperature from low to high (e.g., −100° C. to +200° C.). For example, in the case of using one kind of the first reactive compound and one kind of the second reactive compound, the Tg of each reactive compound can be determined from the Tgs of the resin cured product of the photocurable resin composition. For the separation of the reactive compound from the photocurable resin composition, any known separation technique can be utilized, such as centrifugal separation, extraction, crystallization, column chromatography, and/or recrystallization. The identification of the reactive compound can be made by analyzing the photocurable resin composition, for example, using gas chromatography, liquid chromatography, and/or mass spectrometry.

The solubility parameter is an index for evaluating affinity between substances, and the HSP is represented by a three-dimensional vector consisting of a dispersion term dD, a polar term dP, and a hydrogen bond term dH. In the present specification, the dP of the first reactive compound is denoted by $dP_1$, and the dP of the second reactive compound is denoted by $dP_2$. When the first reactive compound includes two or more kinds of reactive compounds, the $dP_1$ is a polar term dP of the first reactive compound as a mixture, which is determined from the dP and the mass ratio of the individual reactive compound. Likewise, when the second reactive compound includes two or more kinds of reactive compounds, the $dP_2$ is a polar term dP of the second reactive compound as a mixture, which is determined from the dP and the mass ratio of the individual reactive compound.

The dispersion term dD, the polar term dP, and the hydrogen bond term dH of the individual reactive compound can be determined by the following procedures.

First, the photocurable resin composition is analyzed using, for example, gas chromatography, liquid chromatography, and/or mass spectrometry, to determine the kinds and the mass ratio of the reactive compounds. Next, compounds identical to the identified reactive compounds are prepared separately, and the Tg of a resin cured product is determined in a manner similarly to the above, to categorize them into the first reactive compound and the second reactive compound. From the kinds and the mass ratio of the reactive compounds, the HSP (dispersion term dD, polar term dP, and hydrogen bond term dH) of the individual reactive compound is determined using HSP calculation software HSPiP (available from the official websites of HSP and HSPiP).

The HSP may be calculated using the HSPiP database. The HSP of the reactive compound that does not exist in the database can be determined by examining the solubility of the separately prepared individual reactive compound to each of the mediums shown in Table 1. In Table 1, the numerical ratio represented by v/v shows the mixed ratio (volume ratio) of two kinds of mediums.

TABLE 1

| Medium | HSP | | |
|---|---|---|---|
| | dD | dP | dH |
| Hexane | 14.9 | 0.0 | 0.0 |
| Cyclohexane | 16.8 | 0.0 | 0.2 |
| Toluene | 18.0 | 1.4 | 2.0 |
| Ethanol | 15.8 | 8.8 | 19.4 |
| Isopropanol/water 70/30 (v/v) | 15.7 | 9.1 | 24.2 |
| Isopropanol/water 60/40 (v/v) | 15.7 | 10.1 | 26.8 |
| Methanol | 14.7 | 12.3 | 22.3 |
| N-methyl-2-pyrrolidone | 18.0 | 12.3 | 7.2 |
| γ-butyrolactone/water 30/70 (v/v) | 16.3 | 16.2 | 31.8 |
| γ-butyrolactone/water 60/40 (v/v) | 18.1 | 16.4 | 21.4 |
| Propylene carbonate | 20.0 | 18.0 | 4.1 |
| Acetonitrile | 15.3 | 18.0 | 6.1 |
| Ethylene carbonate/water 50/50 (v/v) | 16.8 | 18.9 | 23.7 |
| Ethylene carbonate/water 80/20 (v/v) | 17.5 | 20.6 | 12.5 |
| Glycerin carbonate/water 50/50 (v/v) | 16.7 | 20.8 | 29.9 |
| Ethylene carbonate/propylene carbonate 90/10 (v/v) | 18.2 | 21.3 | 5.0 |
| Glycerin carbonate/water 70/30 (v/v) | 17.2 | 22.7 | 24.9 |
| Glycerin carbonate/N-methyl-2-pyrrolidone 80/20 (v/v) | 17.9 | 22.9 | 15.4 |

Specifically, the HSP of the reactive compound can be determined as follows. The reactive compound is added at a concentration of 0.1 mass % in each of the mediums of Table 1, and stirred at room temperature (e.g., 25° C.) using a roller shaker or a screw pipe for 10 minutes. After the stirring, the mixture is left to stand at room temperature (e.g., 25° C.) for 1 hour. When the reactive compound is settled, it is scored as 0, and when dispersed or dissolved, it is scored as 1. The HSP (i.e., the dispersion term dD, the polar term dP, and the hydrogen bond term dH) of each medium is plotted three-dimensionally. The HSP distribution of the medium in which the reactive compound is dispersed or dissolved is used to create a sphere called a Hansen solubility sphere, to determine a center coordinate of the sphere. With the center coordinate taken as the HSP of the reactive compound, the dispersion term dD, the polar term dP, and the hydrogen bond term dH of the individual reactive compound can be determined.

The polar term $dP_1$ is usually greater than the polar term $dP_2$. Therefore, the difference between the polar term $dP_1$ and the polar term $dP_2$ means $dP_1-dP_2$.

The polar term $dP_1$ of the HSP of the first reactive compound and the polar term $dP_2$ of the HSP of the second reactive compound differ by 1.8 or more, and preferably differ by 2.0 or more. When the difference in the polar term is less than 1.8, although the strength of a resin cured product obtained from the photocurable resin composition can be secured, the toughness thereof becomes extremely low. This is presumably because, as can be inferred from the resin cured product obtained being transparent, the curing reaction has proceeded while the first reactive compound and the second reactive compound have been in a compatibilized state, failing to sufficiently form a phase separation structure. In view of obtaining a more uniform liquid photocurable resin composition and obtaining a favorable phase separation structure easily after curing, the difference in the polar term is preferably 10 or less, more preferably 7 or less, and further more preferably 5 or less. When the difference in the polar term is within the range as above, the toughness can be further increased. These lower limit and upper limit values can be combined in any combination.

The polar term $dP_1$ of the HSP of the first reactive compound and the polar term $dP_2$ of the HSP of the second reactive compound may differ by 1.8 or more (or 2.0 or more) and 10 or less, 1.8 or more (or 2.0 or more) and 7 or less, or 1.8 or more (or 2.0 or more) and 5 or less.

The difference (absolute value of the difference) between the dispersion term $dD_1$ of the HSP of the first reactive compound and the dispersion term $dD_2$ of the HSP of the second reactive compound is not specifically limited, but is, for example, 0.1 or more and 10 or less, and may be 0.1 or more and 5 or less, or 0.5 or more and 2 or less. The difference (absolute value of the difference) between the hydrogen bond term $dH_1$ of the HSP of the first reactive compound and the hydrogen bond term $dH_2$ of the HSP of the second reactive compound is not specifically limited, but is, for example, 0.1 or more and 15 or less, and may be 1 or more and 10 or less, or 4.5 or more and 10 or less.

A detailed description will be given below of the constitution of the photocurable resin composition.

(First Reactive Compound)

The first reactive compound includes at least a reactive monomer (hereinafter, a first reactive monomer), and can form a glass phase through curing.

The Tg of a resin cured product obtained from the first reactive compound (specifically, a resin cured product of each individual reactive compound constituting the first reactive compound) is 0° C. or higher, may be 5° C. or higher, or 10° C. or higher, and may be 50° C. or higher. The first reactive compound preferably includes at least a compound (reactive compound 1A) the resin cured product of which has a Tg of, for example, 50° C. or higher, or 60° C. or higher (preferably 70° C. or higher, or 80° C. or higher). By using the reactive compound 1A, the strength of the resin cured product of the photocurable resin composition can be further improved. In view of achieving a higher strength, in the case of using a reactive compound (reactive compound 1B) the resin cured product of which has a Tg of, for example, lower than 50° C., the reactive compound 1A is preferably used in combination therewith. One kind or two or more kinds of the reactive compounds 1A may be used, and one kind or two or more kinds of the reactive compounds 1B may be used.

The polar term $dP_1$ of the first reactive compound is determined depending on the polar terms dP and the ratio of the individual first reactive compounds. Therefore, the individual first reactive compounds are selected such that their polar terms dP make $(dP_1\text{-}dP_2)$ satisfy the range above. The polar term dP of the individual first reactive compound can be selected, for example, from the range of 1 or more and 25 or less, and may be 3 or more and 20 or less, and may be 4 or more and 20 or less, or 5 or more and 18 or less. When two or more kinds of reactive compounds having different polar terms dP are used in combination, it becomes easy to adjust the polar term $dP_1$, and thus becomes easy to optimize the phase separation structure, and adjust the Tg.

The first reactive compound has a reactive group (hereinafter, a first reactive group), which is exemplified by a functional group capable of reacting or interacting with a radical, cation, anion, or the like generated from the initiator by the action of light. The first reactive group is preferably a group having a polymerizable carbon-carbon unsaturated bond, such as vinyl group, allyl group, acryloyl group, methacryloyl group, and the like.

Preferred as the first reactive group is a radical-polymerizable functional group, such as acryloyl group and methacryloyl group. Herein, the acryloyl group and the methacryloyl group are sometimes collectively referred to as a (meth)acryloyl group. A reactive compound having a (meth)acryloyl group and a reactive compound having another first reactive group (e.g., a vinyl group and/or an allyl group) may be used in combination.

The first reactive compound including at least a (meth)acryloyl group (specifically, including at least a reactive compound having a (meth)acryloyl group), and the second reactive compound including at least a (meth)acryloyl group (specifically, including at least a reactive compound having a (meth)acryloyl group) have excellent compatibility with each other, and tend to be finely dispersed more uniformly in the photocurable resin composition. Therefore, when such reactive compounds are used in combination, it becomes easier to optimize the phase separation structure, which is advantageous in achieving both high toughness and high strength.

For the first reactive compound, in addition to the first reactive monomer, a reactive oligomer (hereinafter, a first reactive oligomer) may be used. One kind or two or more kinds of the first reactive monomers may be used. In view of optimizing the phase separation structure easily, at least the first reactive monomer is to be used. A combination of the first reactive monomer and the first reactive oligomer is also preferable. When the first reactive monomer and the first reactive oligomer are used in combination, it becomes easier to adjust the polar term $dP_1$, and the rubber phase and the glass phase can be easily formed in a balanced manner, which can further ease the optimization of the phase separation structure. Furthermore, by using the first reactive oligomer, the strength can be further improved, and the curing rate can be easily increased.

(First Reactive Monomer)

The first reactive monomer may be a monofunctional reactive monomer, or a polyfunctional reactive monomer, and may be a combination of a monofunctional reactive monomer and a polyfunctional reactive monomer.

Examples of the monofunctional reactive monomer include a vinyl-series monomer, an allylic monomer, and an acrylic monomer. The vinyl-series monomer is, for example, a monomer having a vinyl group, which is exemplified by a vinyl ether of a monohydric alcohol, an aromatic vinyl monomer (e.g., styrene), an alicyclic vinyl monomer, and a heterocyclic compound having a vinyl group (e.g., N-vinylpyrrolidone). The allylic monomer is, for example, a monomer having an allyl group, which is exemplified by an allyl ether of a monohydric alcohol. The acrylic monomer is, for example, a monomer having a (meth)acryloyl group, which is exemplified by a (meth)acrylic acid ester of a monohydric alcohol, an acid amide of a nitrogen-containing compound and a (meth)acrylic acid, and a (meth)acrylic acid. Here, acrylic acid and methacrylic acid are collectively referred to as a (meth)acrylic acid. An acrylic acid ester (or acrylate) and a methacrylic acid (or methacrylate) are collectively referred to as a (meth)acrylic acid ester (or (meth) acrylate).

The monohydric alcohol may be an aliphatic alcohol, an alicyclic alcohol, or an aromatic alcohol. The aliphatic alcohol may have an aromatic ring, an aliphatic ring, or a heterocyclic ring. The aliphatic ring may be a bridged ring. Examples of the aliphatic alcohol include alkyl alcohols (e.g., $C_{1\text{-}20}$ alkyl alcohols, such as methanol, ethanol, propanol, isopropanol, 2-hydroxypropyl alcohol, butanol, hexanol, nonyl alcohol, isononyl alcohol, lauryl alcohol, stearyl alcohol, and isostearyl alcohol), benzyl alcohol, phenethyl alcohol, a monoester of phthalic acid and ethylene glycol, phenoxyethyl alcohol, and cyclohexane methanol. Examples of the alicyclic alcohol include alicyclic $C_{5\text{-}20}$ alcohols (e.g., alicyclic $C_{5\text{-}10}$ alcohols), such as cyclohexanol, menthol, borneol, isoborneol, and dicyclopentanyl alcohol. Examples of the aromatic alcohol include aromatic $C_{6\text{-}10}$ alcohols, such as phenol and naphthol. Examples of the heterocyclic alcohol include aliphatic alcohols (e.g., $C_{1\text{-}4}$ aliphatic alcohols) having a heterocyclic group (e.g., a 4- or more- and 8- or less-membered heterocyclic group) containing nitrogen, oxygen, and/or sulfur, as a constituent atom(s) of the ring. The heterocyclic alcohol is exemplified by furfuryl alcohol and tetrahydrofurfuryl alcohol. Examples of the nitrogen-containing compound constituting the acid amide together with the (meth)acrylic acid include aliphatic amines (e.g., triethylamine, ethanolamine), alicyclic amines (e.g., cyclohexylamine), aromatic amines (e.g., aniline), and nitrogen-containing cyclic compounds. Examples of the nitrogen-containing cyclic compound include pyrrole, pyrrolidine, piperidine, pyrimidine, morpholine, and thiazine. The nitrogen-containing cyclic compound is preferably of a 5- or more- and 8- or less-membered ring, and may be a 5-membered or a 6-membered ring.

The polyfunctional reactive monomer may have two or more first reactive groups. The number of the first reactive groups is, for example, two or more and four or less, and may be two or three. The polyfunctional reactive monomer may be used singly or in combination of two or more kinds.

The polyfunctional reactive monomer is, for example, a compound in which at least two hydroxy groups of the polyol are substituted by at least one kind of group selected from the group consisting of vinyl ether group, allyl ether group, acryloyloxy group, and methacryloyloxy group. The polyol may be either an aliphatic polyol (e.g., an alkylene glycol, trimethylolpropane, pentaerythritol, a sugar alcohol), an alicyclic polyol (e.g., a dihydroxycyclohexane), or an aromatic polyol (e.g., a dihydroxybenzene, a dihydroxynaphthalene). Examples of the alkylene glycol include $C_{2\text{-}10}$ alkylene glycols, such as ethylene glycol, trimethylene glycol, 1,4-butanediol, and hexanediol. The aliphatic polyol may have an aromatic ring, an aliphatic ring, or a heterocyclic ring (e.g., a 4- or more- and 8- or less-membered heterocyclic ring containing oxygen, nitrogen and/or sulfur, as a constituent element(s) of the ring). Such an aliphatic polyol is exemplified by cyclohexane dimethanol, tricyclodecane dimethanol, and benzene dimethanol. The polyfunctional reactive monomer may be an ether having at least two first reactive groups.

The first reactive monomer preferably has an aliphatic ring, a heterocyclic ring (including the above nitrogen-containing ring), or the like, since in this case, high strength tends to be achieved, and the distortion during curing is small. Specifically, the first reactive monomer is preferably a heterocyclic compound having a vinyl group, an ester of an alicyclic alcohol and a (meth)acrylic acid, an ester of a heterocyclic alcohol and a (meth)acrylic acid, an acid amide of a nitrogen-containing cyclic compound and a (meth) acrylic acid.

The first reactive monomer may be used singly or in combination of two or more kinds.

In the case of using two or more kinds of first reactive monomers, the polar terms dP of the first reactive monomers used may the same, or reactive monomers whose dP values are different may be used in combination. Although the closer the polar terms dP of the first reactive monomers to be combined are, the curing reaction of the first reactive monomer tends to proceed rapidly, the polar term dP of the first reactive monomer may be selected according to the polar term dP of each second reactive compound. When the first reactive oligomer is used, the polar term dP of the first reactive monomer is selected according to the polar term dP of the first reactive oligomer. Furthermore, in the case of using two or more kinds of the first reactive monomers, the first reactive monomers may be selected such that the Tg of a cured product falls within a desired range.

In view of more easily optimizing the phase separation structure, the first reactive monomer preferably at least includes a monofunctional reactive monomer. The proportion of the monofunctional reactive monomer in the first reactive monomer is, for example, 90 mass % or more, and may be 95 mass % or more. The first reactive monomer may include the monofunctional reactive monomer only.

The first reactive monomer occupies, for example, 40 mass % or more, preferably 50 mass % or more, and more preferably 55 mass % or more of the total amount of the first reactive compound and the second reactive compound. When the proportion of the first reactive monomer is in the range as above, the phase separation structure can be more easily optimized, and it becomes easy to obtain a resin cured product having a good balance between the toughness and the strength. The proportion of the first reactive monomer is, for example, 85 mass % or less, and preferably 80 mass % or less. These lower and upper limit values can be combined in any combination.

The first reactive monomer may occupy 40 mass % or more and 85 mass % or less (or 80 mass % or less), 50 mass % or more and 85 mass % or less (or 80 mass % or less), or 55 mass % or more and 85 mass % or less (or 80 mass % or less) of the total amount of the first reactive compound and the second reactive compound.

(First Reactive Oligomer)

The first reactive oligomer may be a monofunctional oligomer having one first reactive group, and may be a polyfunctional oligomer having two or more first reactive groups. The number of the first reactive groups in the polyfunctional oligomer is, for example, two or more and eight or less, may be two or more and four or less, and may be two or three.

The first reactive oligomer preferably includes an oligomer having a (meth)acryloyl group. The content of the reactive oligomer having a (meth)acryloyl group in the first reactive oligomer is, for example, 90 mass % or more, and preferably 95 mass % or more, and the first reactive oligomer may be constituted only of a reactive oligomer having a (meth)acryloyl group.

The first reactive oligomer has the first reactive group and is a compound the resin cured product of which has a Tg of 0° C. or higher. The first reactive oligomer is preferably, for example, a (meth)acrylate of an oligomer-type polyol. The first reactive oligomer also encompasses (meth)acrylates of bisphenols and (meth)acrylates of hydrogenated bisphenols. Examples of the oligomer-type polyol include polyether polyols, polyester polyols, polyurethane polyols, polyesterurethane polyols, and polyetherurethane polyols. The polyol is preferably a non-aromatic polyol, since in this case, high strength of a resin cured product tends to be ensured, and it can easily react with the first reactive monomer, and in addition, the polar term $dP_1$ can be easily adjusted. Examples of the first reactive oligomer include CN983NS and CN9893NS, which are urethane acrylate oligomers manufactured by Arkema S.A. Another example thereof is EBECRYL8811, which is a urethane acrylate oligomer manufactured by Daicel-Allnex Ltd.

The first reactive oligomer may be used singly or in combination of two or more kinds.

In the case of using two or more kinds of first reactive oligomers, the polar terms dP of the first reactive oligomers used may be the same, or reactive oligomers whose dP values are different may be used in combination. The polar term dP of the first reactive oligomer can be selected according to the polar term dP of each second reactive compound. Furthermore, in the case of using two or more kinds of the first reactive oligomers, the first reactive oligomers may be selected such that the Tg of a cured product falls within a desired range.

The polar term dP of the first reactive oligomer is selected according to the polar term $dP_2$ of the second reactive compound and the polar term dP of the first reactive monomer. The polar term dP of the individual first reactive oligomer may be, for example, 3 or more, and may be 5 or more, but is preferably 10 or more, more preferably 12 or more. When the polar term dP of the first reactive oligomer is in the range as above, it becomes easy to adjust the difference between the polar term $dP_1$ and the polar term $dP_2$, and the phase separation structure can be easily controlled. The polar term dP of the individual first reactive oligomer is, for example, 25 or less, and is preferably 20 or less. When the polar term dP of the first reactive oligomer is in the range as above, the first reactive oligomer is easily compatible with the first reactive monomer and the second reactive compound, which can ease the optimization of the phase separation structure.

The polar term dP of the individual first reactive oligomer may be 3 or more and 25 or less (or 20 or less), 5 or more and 25 or less (or 20 or less), 10 or more and 25 or less (or 20 or less), or 12 or more and 25 or less (or 20 or less).

The weight average molecular weight Mw of the first reactive oligomer is, for example, 40,000 or less, and may be 30,000 or less, but is preferably less than 10,000, more preferably less than 5,000. When the Mw is in the range as above, high compatibility with the first reactive monomer tends to be ensured, and the viscosity of the photocurable resin composition tends to be kept low. The Mw of the first reactive oligomer is, for example, 500 or more, and preferably 1,000 or more. When the Mw is in the range as above, a glass phase is likely to be formed, tending to result in high strength, and in addition, the curing rate tends to be increased. These upper limit and lower limit values can be combined in any combination.

The Mw of the first reactive oligomer may be 500 or more (or 1,000 or more) and 40,000 or less, 500 or more (or 1,000 or more) and 30,000 or less, 500 or more (or 1,000 or more) and less than 10,000, or 500 or more (or 1,000 or more) and less than 5,000.

In the present specification, the weight average molecular weight Mw is a weight average molecular weight based on polystyrene, as measured using gel permeation chromatography (GPC).

The Mw of the first oligomer can be determined, for example, by the following procedures.

The first oligomer is dissolved in a solvent, to prepare a measurement sample. The solvent is selected from liquid mediums capable of dissolving the first oligomer, according to the kind of the first oligomer. The measurement sample is subjected to GPC under the conditions below, to determine its Mw.

Device: SYSTEM-21H, manufactured by Shodex Co., Ltd.
Detector: RI detector
Mobile phase: Tetrahydrofuran
Flow rate: 1 mL/min
Column: KD-806M (×3 columns), manufactured by Shodex Co., Ltd.
Column temperature: 40° C.
Reference material: Standard polystyrene (Mw=65000, 5780, 589)

The Mw is usually measured with respect to the first oligomer to be used in the photocurable resin composition. However, when the first oligomer is not easily available, the first oligomer separated from the photocurable resin composition by a known separation and purification method or other methods may be used to measure its Mw.

The first reactive oligomer occupies, for example, 1 mass % or more, preferably 5 mass % or more, and more preferably 10 mass % or more of the total amount of the first reactive compound and the second reactive compound. When the proportion of the first reactive oligomer is in the range as above, a glass phase is likely to be formed, tending to result in high strength, and in addition, the curing rate tends to be increased. The proportion of the first reactive oligomer is, for example, 30 mass % or less, and may be 25 mass % or less, or 20 mass % or less. When the proportion of the first reactive oligomer is in the range as above, high compatibility with the first reactive monomer tends to be ensured, and the viscosity of the photocurable resin composition tends to be kept low. These upper limit and lower limit values can be combined in any combination.

The proportion of the first reactive oligomer may be, for example, 1 mass % or more and 30 mass % or less, 1 mass % or more and 25 mass % or less, 1 mass % or more and 20 mass % or less, 5 (or 10) mass % or more and 30 mass % or less, 5 (or 10) mass % or more and 25 mass % or less, or 5 (or 10) mass % or more and 20 mass % or less.

(Second Reactive Compound)

The second reactive compound includes at least a reactive oligomer (hereinafter, a second reactive oligomer), and can form a rubber phase through curing.

The Tg of the second reactive compound (specifically, a resin cured product of the individual reactive compound constituting the second reactive compound) is lower than 0° C., may be −10° C. or lower, or −20° C. or lower, and may be −50° C. or lower. The lower limit of the Tg is not specifically limited, but is, for example, −80° C. or higher, and preferably −70° C. or higher. These upper limit and lower limit values may be combined in any combination. When the Tg is in the range as above, a rubber phase that can impart high toughness to a resin cured product of the photocurable resin composition tends to be formed.

The Tg of the second reactive compound may be −80° C. or higher (or −70° C. or higher) and lower than 0° C., −80° C. or higher (or −70° C. or higher) and −10° C. or lower, −80° C. or higher (or −70° C. or higher) and −20° C. or lower, or −80° C. or higher (or −70° C. or higher) and −50° C. or lower.

The polar term $dP_2$ of the second reactive compound is determined depending on the polar terms dP and the ratio of the individual second reactive compounds. Therefore, the individual second reactive compounds may be selected such that their polar terms dP make $(dP_1-dP_2)$ satisfy the range above, according to the $dP_1$ of the first reactive compound. The polar term dP of the individual second reactive compound is, for example, 1 or more and 10 or less, and may be 3 or more and 8 or less, or 5 or more and 8 or less. When the polar term dP of the second reactive compound is in the range as above, high compatibility with the first reactive monomer tends to be ensured, and a rubber phase that can impart high toughness to a resin cured product of the photocurable resin composition tends to be formed. Furthermore, it becomes easy to adjust the difference between the polar term $dP_1$ and the polar term $dP_2$, which can further ease the optimization of the phase separation structure.

The second reactive compound has a reactive group (hereinafter, a second reactive group), which is exemplified by a functional group capable of reacting or interacting with a radical, cation, anion, or the like generated from the initiator by the action of light. The second reactive group is selected, for example, from those exemplified for the first reactive group. Preferred as the second reactive group is a radical-polymerizable functional group, such as a (meth)acryloyl group. Optionally, a reactive compound having a (meth)acryloyl group and a reactive compound having another second reactive group (e.g., a vinyl group and/or an allyl group) may be used in combination.

For the second reactive compound, in addition to the second reactive oligomer, a reactive monomer (hereinafter, a second reactive monomer) may be used. A preferable second reactive compound has the second reactive group and is a compound the resin cured product of which has a Tg of lower than 0° C.

The second reactive compound may be a monofunctional compound having one second reactive group, and may be a polyfunctional compound having two or more second reactive groups. In the polyfunctional second reactive compound, the number of the second reactive groups may be, for example, two or more and eight or less, may be two or more and four or less, and may be two or three.

In order to slow the curing reaction with the first reactive monomer in the early stage, and form a rubber phase to be phase-separated from a glass phase, the ratio of the second reactive oligomer in the second reactive compound is preferably high. The ratio of the second reactive oligomer in the second reactive compound is, for example, 90 mass % or more, and preferably 95 mass % or more. The second reactive compound may be constituted only of the second reactive oligomer.

The second reactive oligomer preferably includes an oligomer having a (meth)acryloyl group. The content of the reactive oligomer having a (meth)acryloyl group in the second reactive oligomer is, for example, 90 mass % or more, and preferably 95 mass % or more. The second reactive oligomer may be constituted only of the reactive oligomer having a (meth)acryloyl group.

Examples of the second reactive monomer include (meth) acrylates of aliphatic alcohols (e.g., $C_{8-14}$ aliphatic alcohols), such as isooctyl acrylate, isodecyl acrylate, lauryl (meth) acrylate, tridecyl (meth)acrylate, and alkoxylated lauryl acrylates; (meth)acrylates of heterocyclic alcohols, such as tetrahydrofurfuryl acrylate and alkoxylated tetrahydrofurfuryl acrylates. The second reactive monomer may be used singly or in combination of two or more kinds.

The second reactive oligomer is preferably, for example, a (meth)acrylate of an oligomer-type polyol. Examples of the oligomer-type polyol include polyether polyols, polyester polyols, polyurethane polyols, polyesterurethane polyols, and polyetherurethane polyols. The polyol is preferably a non-aromatic polyol, since in this case, high toughness of a resin cured product tends to be ensured, and the polar term $dP_2$ can be easily adjusted. Examples of the second reactive oligomer include CN966, which is a urethane acrylate oligomer manufactured by Arkema S.A. Another example thereof is EBECRYL270, which is a urethane acrylate oligomer manufactured by Daicel-Allnex Ltd.

The second reactive oligomer may be used singly or in combination of two or more kinds.

The weight average molecular weight Mw of the second reactive oligomer is, for example, 40,000 or less, and may be 30,000 or less, but is preferably less than 10,000, more preferably less than 5,000. When the Mw is in this range as above, high compatibility with the first reactive compound tends to be ensured, and the viscosity of the photocurable resin composition tends to be kept low. The Mw of the second reactive oligomer is, for example, 500 or more, and preferably 1,000 or more. When the Mw is in the range as above, a rubber phase is likely to be formed, tending to result in high toughness. These upper limit and lower limit values can be combined in any combination.

The Mw of the second reactive oligomer may be 500 or more (or 1,000 or more) and 40,000 or less, 500 or more (or 1,000 or more) and 30,000 or less, 500 or more (or 1,000 or more) and less than 10,000, or 500 or more (or 1,000 or more) and less than 5,000.

The Mw of the second reactive oligomer can be measured in a similar manner to that of the first reactive oligomer.

One kind or two or more kinds of reactive compounds may be used as the second reactive compound. In the case of using two or more kinds of second reactive compounds, the polar terms dP of the second reactive oligomers used may be the same, or reactive oligomers whose dP values are different may be used in combination. The polar term dP of the second reactive compound can be selected according to the polar term dP of each first reactive compound. Furthermore, in the case of using two or more kinds of second reactive compounds, the second reactive compounds may be selected such that the Tg of a cured product falls within a desired range.

The second reactive compound occupies, for example, 15 mass % or more, preferably 17 mass % or more, and more preferably 20 mass % or more of the total amount of the first reactive compound and the second reactive compound. When the proportion of the second reactive compound is in the range as above, a rubber phase that can impart high toughness to a resin cured product of the photocurable resin composition can be easily formed. The proportion of the second reactive compound is, for example, 35 mass % or less, and may be 30 mass % or less. Even when the proportion of the second reactive compound is small as above, high toughness can be achieved, and in addition, high compatibility with the first reactive compound tends to be ensured, and the viscosity of the photocurable resin composition tends to be kept low. These lower limit and upper limit values can be combined in any combination.

The second reactive compound may occupy 15 mass % or more and 35 mass % or less (or 30 mass % or less), 17 mass % or more and 35 mass % or less (or 30 mass % or less), or 20 mass % or more and 35 mass % or less (or 30 mass % or less) of the total amount of the first reactive compound and the second reactive compound.

(Photopolymerization Initiator)

The photopolymerization initiator is activated by the action of light and initiates the curing (specifically, polymerization) of the photocurable resin composition. Such a photopolymerization initiator is sometimes referred to as a photo-reaction initiator.

The photopolymerization initiator may be, for example, a radical polymerization initiator that generates a radical by the action of light, or that generates an acid (or cation) or a base (or anion) by the action of light (specifically, a cation-generating agent, an anion-generating agent). The photopolymerization initiator may be used singly or in combination of two or more kinds. The photopolymerization initiator is selected according to the type of the first reactive group and the second reactive group (e.g., whether radically polymerizable or cationically polymerizable). The radical polymerization initiator is exemplified by an alkylphenone-series polymerization initiator, an acylphosphine oxide-series polymerization initiator, and the like.

Examples of the alkylphenone-series polymerization initiator include 2,2-dimethoxy-1,2-diphenylethan-1-one (BASF SE, IRGACURE 651), 1-hydroxy-cyclohexyl-phenyl-ketone (BASF SE, IRGACURE 184), 2-hydroxy-2-methyl-1-phenyl-propan-1-one (BASF SE, IRGACURE 1173), 1-[4-(2-hydroxyethoxy)-phenyl]-2-hydroxy-2-methyl-1-propan-1-one (BASF SE, IRGACURE 2959), 2-hydroxy-1-{4-[4-(2-hydroxy-2-methyl-propionyl)-benzyl]phenyl}-2-methyl-propan-1-one (BASF SE, IRGACURE 127), 2-methyl-1-(4-methylthiophenyl)-2-morpholinopropan-1-one (BASF SE, IRGACURE 907), 2-benzyl-2-dimethylamino-1-(4-morpholinophenyl)-butanone-1 (BASF SE, IRGACURE 369E), and 2-(dimethylamino)-2-[(4-methylphenyl)methyl]-1-[4-(4-morpholinyl) phenyl]-1-butanone (BASF SE, IRGACURE 379EG).

Examples of the acylphosphine oxide-series polymerization initiator include 2,4,6-trimethylbenzoyl-diphenyl-phosphine oxide (BASF SE, IRGACURE TPO), and bis(2,4,6-trimethylbenzoyl)-phenylphosphine oxide (BASF SE, IRGACURE 819).

(Others)

The photocurable resin composition may further include one or more other known photocurable resins. The photocurable resin composition can include one or more known additives.

The viscosity at 50° C. of the photocurable resin composition is, for example, 300 mPa·s or less, and may be as low as 100 mPa's or less. The photocurable resin composition has a relatively low viscosity as above, and is suitably applicable for inkjet-type optical shaping.

The photocurable resin composition can be obtained by mixing its constituent components. The photocurable resin composition may be of one-liquid curing type or two-liquid curing type.

In the photocurable resin composition according to the above aspect, the first reactive compound and the second reactive compound are compatibilized, but with the progress of curing of the photocurable resin composition, phase separation proceeds, forming a glass phase and a rubber phase. By controlling the difference between the polarity term $dP_1$ of the HSP of the first reactive compound and the polarity term $dP_2$ of the HSP of the second reactive compound, the reactive compounds are allowed to be present in a compatibilized state in the liquid photocurable resin composition, and with the progress of curing, an optimized phase separation structure can be formed. Thus, the toughness improvement effect due to the flexible rubber phase can be effectively exerted, and high strength can be ensured by the glass phase.

The photocurable resin composition can be cured by the action of light into a resin cured product, and can be particularly suitably used for forming a two- or three-dimensional optical shaped object (resin cured product) through curing by light irradiation. The present invention encompasses a resin cured product obtained by curing the photocurable resin composition. Also, the present invention encompasses a resin cured product of a photocurable resin composition containing the first reactive compound, the second reactive compound, and the photopolymerization initiator, the resin cured product having a phase separation structure of a glass phase and a rubber phase, and having an Izod impact strength within the range mentioned above and a Tg within the range mentioned above. In these resin cured products, high toughness and high strength can be both realized.

The toughness of the resin cured product of the photocurable resin composition can be evaluated from, for example, the Izod impact strength, or the like. With respect to the resin cured product of the curable resin composition according to the above aspects, the Izod impact strength as measured in accordance with ASTM D256 is, for example, 80 J/m or more. The Izod impact strength can be 100 J/m or more, and can be 130 J/m or more, or 200 J/m or more. The Izod impact strength is measured on a sample of the resin cured product having a size of 62 mm long, 12 mm wide, and 6 mm thick.

The Tg of the resin cured product of the photocurable resin composition is, for example, 60° C. or higher, and can be 70° C. or higher. The Tg of the resin cured product is, for example, 150° C. or lower, and may be 140° C. or lower, and may be 120° C. or lower. The resin cured product having such a Tg tends to have balanced high strength and high heat resistance suitable for practical use.

The Tg can be measured using a commercially available DMA, for a resin cured product obtained from the photocurable resin composition.

The strength of a resin cured product of the photocurable resin composition can be evaluated from, for example, a Shore D hardness. The Shore D hardness measured in accordance with JIS K7215: 1986 of the resin cured product of the photocurable resin composition according to the above aspect is, for example, 60 or more, and preferably 65 or more.

The Shore D hardness can be measured, for example, using a type D durometer, in accordance with JIS K7215: 1986, with respect to a sample of the resin cured product of 40 mm long, 20 mm wide, and 6 mm thick.

In the resin cured product of the photocurable resin composition, the glass phase and the rubber phase form at least one kind of phase separation structure selected from the group consisting of a sea-island structure and a co-continuous phase structure. In this case, excellent toughness and high strength can be obtained in a balanced manner.

The sea-island structure may be a structure in which the rubber phases are dispersed in the glass phase or a structure in which the glass phases are dispersed in the rubber phase. The average particle diameter of the dispersed phases (islands) in the sea-island structure is, for example, 800 nm or more, and may be 1 µm or more. The average particle diameter of the islands is, for example, 5 µm or less, and preferably 3 µm or less, or 2 µm or less. These lower limit and upper limit values can be combined in any combination. When the islands has such an average particle diameter, the sea-island structure is in such a state that the rubber phases (or glass phases) having been grown into such a size from the compatibilized state are more uniformly dispersed in the glass phase (or rubber phase), and therefore, both high toughness and high strength tend to be ensured.

The average particle diameter of the dispersed phases (islands) in the sea-island structure may be 800 nm or more (or 1 µm or more) and 5 µm or less, 800 nm or more (or 1 µm or more) and 3 µm or less, or 800 nm or more (or 1 µm or more) and 2 µm or less.

The average particle diameter of the islands can be determined, for example, on an electron micrograph of a cross section of the resin cured product, using an image analysis software (e.g., "A-Image-Kun", produced by Asahi Kasei Engineering Corporation). Alternatively, it can be determined by selecting 10 islands at random in the electron micrograph, to measure a diameter of a circle having an area equal to that of a region surrounded by the outer circumference of each of the islands, and averaging the measured values.

The photocurable resin composition can be formed into a two-, three-, or higher-dimensional shaped-object (or pattern), by various shaping methods, and is particularly suitably used for optical shaping. Being liquid at room temperature, the photocurable resin composition may be used, for example, for a vat-using optical shaping, and may be used for an inkjet-type optical shaping.

The three-dimensional optical shaped object can be produced by, for example, a method including: a step (i) of forming a liquid film of the photocurable resin composition and curing the liquid film, to form a pattern; a step (ii) of forming another liquid film so as to be in contact with the pattern; and a step (iii) of curing the liquid film formed on the pattern, to form another pattern laminated to the pattern.

A description will be given below of an example of procedures of vat-using optical shaping.

Figure 1:
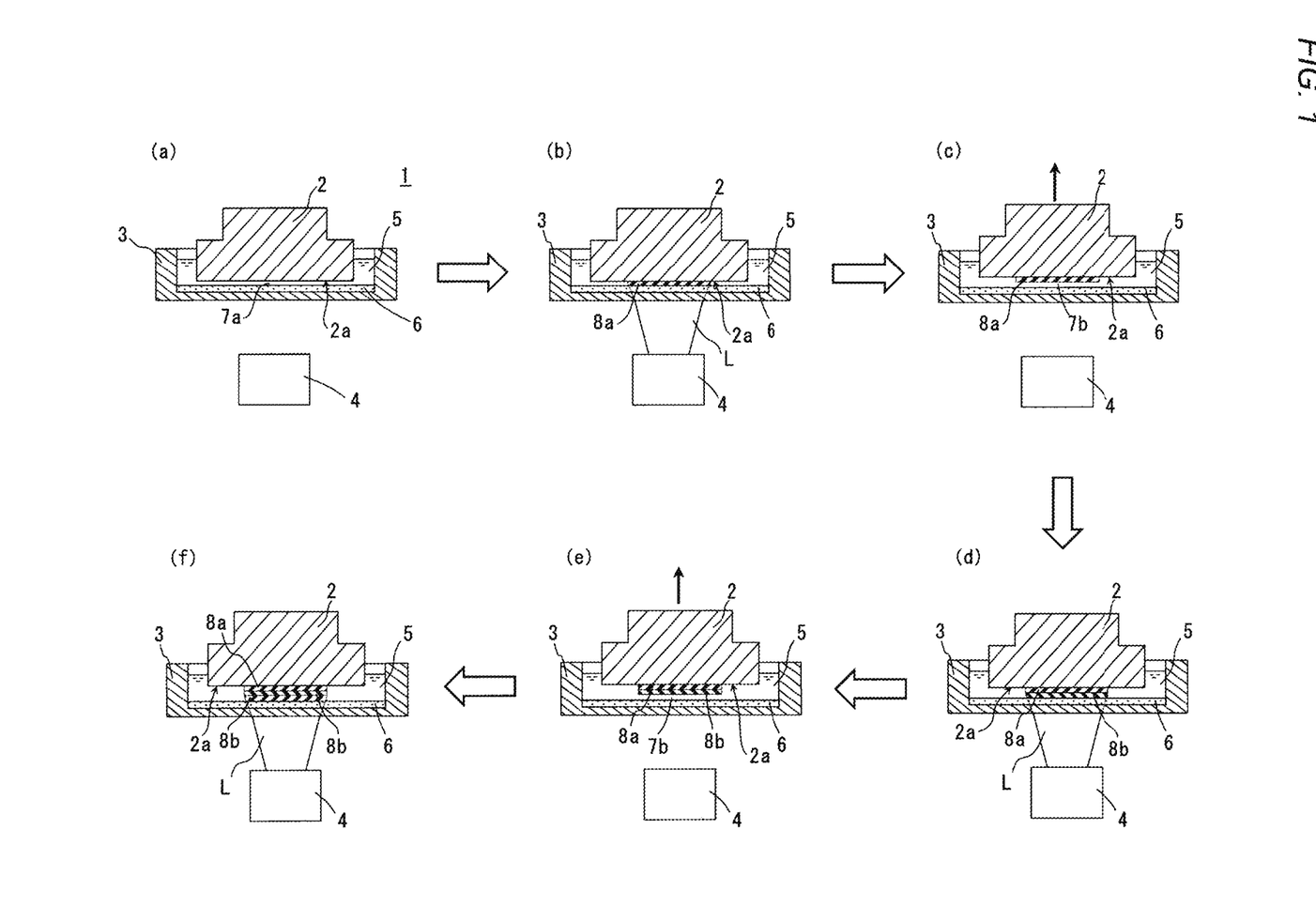
FIG. 1 A schematic diagram for explaining the steps for forming a resin cured product by optical shaping, using a photocurable resin composition according to one embodiment of the present invention.

FIG. 1 shows an exemplary case of forming a three-dimensional shaped-object by using an optical shaping apparatus (patterning apparatus) including a resin tank (vat). Although the illustrated example shows a suspension-type shaping, any method may be employed that can perform three-dimensional optical shaping using the photocurable resin composition. The light irradiation (exposure) is not limited to a specific style, and may be point exposure or plane exposure.

A patterning apparatus 1 includes a platform 2 having a pattern forming surface 2a, a resin tank 3 containing a photocurable resin composition 5, and a projector 4 serving as a light source of plane exposure.

(i) Step of Forming Liquid Film and Curing into Pattern

In the step (i), as shown in (a), first, the pattern forming surface 2a of the platform 2, while being faced to the projector 4 (i.e., the bottom surface of the resin tank 3), is submerged in the photocurable resin composition 5 contained in the resin tank 3. At this time, the height of the pattern forming surface 2a (or the platform 2) is adjusted such that a liquid film 7a (liquid film a) can be formed between the pattern forming surface 2a and the projector 4 (or the bottom surface of the resin tank 3). Next, as shown in (b), the liquid film 7a is irradiated with (plane-exposed to) light L emitted from the projector 4 and cured into a pattern 8a (pattern a).

In the patterning device 1, the resin tank 3 serves as a supply unit for supplying the photocurable resin composition 5. The resin tank is desirably optically clear to the exposure wavelength, at least at a portion present between the liquid film and the projector 4 (in the illustrated example, the portion is the bottom), so that the liquid film can be irradiated with light emitted from the light source. The shape, material, size and the like of the platform 2 are not specifically limited.

After the liquid film a is formed, the liquid film a is photocured by light irradiation from the light source toward the liquid film a. The light irradiation can be performed by any known method. Although FIG. 1 illustrates the case of plane exposure, the light exposure system is not limited to a specific style, and may be point exposure or plane exposure. The light source may be any known light source used for photocuring. In the case of point exposure, for example, a plotter, a galvano laser (or galvano scanner), an SLA (stereolithography), or the like can be used. In the case of a plane exposure system, a projector can be conveniently used as a light source. Examples of the projector include LCD (transmission-type liquid crystal), LCOS (reflection-type liquid crystal), and DLP (registered trademark, Digital Light Processing) projectors. The exposure wavelength can be selected as appropriate, according to the kind and the like of the components of the photocurable resin composition.

(ii) Step of Forming Liquid Film between Pattern a and Light Source

In the step (ii), the photocurable resin composition is supplied between the pattern a obtained in the step (i) and the light source, to form a liquid film (liquid film b). In short, a liquid film b is formed on the pattern a formed on the pattern forming surface. For the supply of the photocurable resin composition, the description of the step (i) can be referred to.

For example, in the step (ii), as shown in (c) in FIG. 1, after the two-dimensional pattern 8a (two-dimensional pattern a) is formed, the pattern formation surface 2a may be lifted together with the platform 2. Along therewith, the photocurable resin composition 5 is supplied between the two-dimensional pattern 8a and the bottom surface of the resin tank 3. Thus, a liquid film 7b (liquid film b) can be formed.

(iii) Step of Laminating Another Pattern b on Pattern a

In the step (iii), the liquid film b formed in the step (ii) is exposed to light from the light source, so that the liquid film b is photocured. Thus, another pattern (pattern b obtained by photocuring of the liquid film b) is laminated on the pattern a. By laminating patterns one after another in the thickness direction in this way, a three-dimensional shaped-pattern can be formed.

For example, as shown in (d) in FIG. 1, the liquid film 7b (liquid film b) formed between the pattern 8a (pattern a) and the bottom surface of the resin tank 3 is exposed to light emitted from the projector 4, so that the liquid film 7b is photocured. This photocuring converts the liquid film 7b into a pattern 8b (pattern b). In this way, the pattern 8b can be laminated on the pattern 8a.

For the light source, exposure wavelength and the like, the description of the step (i) can be referred to.

(iv) Step of Repeating Steps (ii) and (iii)

The first step can include a step (iv) of repeating the steps (ii) and (iii) a plurality of times. Through this step (iv), a plurality of patterns b are laminated in the thickness direction, and a more three-dimensional shaped-pattern can be obtained. The number of times of repeating can be determined as appropriate according to the shape, size, and the like of a desired three-dimensional shaped-object (three-dimensional shaped-pattern).

For example, as shown in (e) in FIG. 1, the platform 2, with the pattern 8a (pattern a) and the pattern 8b (pattern b) laminated on the pattern forming surface 2a, is lifted. Along therewith, the liquid film 7b (liquid film b) is formed between the pattern 8b and the bottom surface of the resin tank 3. Then, as shown in (f) in FIG. 1, the liquid film 7b is exposed to light emitted from the projector 4, so that the liquid film 7b is photocured. This forms another pattern 8b (pattern b) on the pattern 8b. By repeating (e) and (f) alternately, a plurality of the patterns 8b (two-dimensional patterns b) can be laminated.

The three-dimensional shaped-pattern obtained as a final product in the step (iii) or (iv) has some uncured photocurable resin composition attached thereto, and therefore, is usually subjected to cleaning with a solvent.

The three-dimensional shaped-pattern obtained as a final product in the step (iii) or (iv) may be optionally subjected to post-curing. The post-curing can be performed by irradiating the pattern with light. The conditions of light irradiation can be adjusted as appropriate according to the kind of the photocurable resin composition, the degree of curing of the obtained pattern, and the like. The post-curing may be performed on a part of the pattern, and may be performed on the whole thereof.

EXAMPLES

The present invention will be more specifically described below with reference to Examples and Comparative Examples. It is to be noted, however, the present invention is not limited to the following Examples.

Examples 1 to 6 and Comparative Examples 1 to 3

(1) Preparation of Photocurable Resin Composition

The first reactive compound and the second reactive compound shown in Tables 2A, 2B and 3A were each used in a mass ratio shown in Table 3A, and with respect to 100 parts by mass of the total amount of these reactive compounds, 5 parts by mass of a photopolymerization initiator (BASF SE, IRGACURE TPO) and 0.05 parts by mass of methylhydroquinone serving as a polymerization inhibitor were used. All these components were mixed and stirred at 60° C., to prepare a transparent and uniform photocurable resin composition in a liquid state.

The photocurable resin compositions all had fluidity even when cooled to 25° C. and were transparent and uniform.

The dispersion term dD, the polarity term dP, and the hydrogen bond term dH of the HSP of the first reactive monomer were calculated by entering a SMILES character string related to the chemical structure used in the Chem Draw software, in Calculate HSP of HSP calculation software HSPiP.

The dispersion term dD, the polarity term dP, and the hydrogen bonding term dH of the HSP of the first reactive oligomer, and those of the second reactive oligomer were determined in the procedures as described above using the mediums shown in Table 1.

(2) Evaluation

The following evaluations were performed using the photocurable resin compositions obtained in (1) above.

(a) Viscosity

The viscosity of the photocurable resin composition was measured at two temperature, 25° C. and 50° C., at a rotor rotation speed of 100 rpm, using an E-type viscometer (TVE-20H, Toki Sangyo Co., Ltd.).

(b) Izod impact strength and appearance of resin cured product

The photocurable resin composition was poured in a volume of 1.5 mL into a tray to form a liquid film. The liquid film was exposed to light and cured, using a UV instant curing equipment (Unicure system, manufactured by Ushio Inc.) at 50 mW/cm² for 20 seconds. This operation was performed four times, and a notched specimen of 62 mm long, 12 mm wide, and 6 mm thick was prepared. The specimen was measured for its Izod impact strength, in accordance with ASTM D256 at a hammer speed of 3.46 m/s.

The specimen was observed visually for its appearance.

(c) Tg

On a glass plate with a 100-μm-thick polytetrafluoroethylene sheet placed at four corners of its one principal surface, a few drops of the photocurable resin composition were placed at and around the center of the principal surface of the glass plate. Another glass plate was placed thereon, and these glass plates were held by a clip. Using a UV instant curing equipment (Unicure system, manufactured by Ushio Inc.), the photocurable resin composition was cured by light irradiation at 50 mW/cm² for 30 seconds, to prepare a sample.

The obtained sample was heated at elevated temperatures from −100° C. to +200° C., using DMA (DVA-200, manufactured by IT Keisoku Seigyo, Co.) at a frequency of 1 Hz and at a temperature elevation rate of 5° C./min. The temperature at which the tanδ reached a maximum (top peak) was determined as the Tg.

(d) Shore D Hardness

In a similar manner to the (b) above, a sample of 40 mm long, 20 mm wide and 6 mm thick for hardness measurement was prepared using the photocurable resin composition. The samples was measured for its Shore D hardness using a type D durometer, in accordance with JIS K7215: 1986.

(e) Average Particle Diameter of Dispersed Phases

In a similar manner to the (d) above, a resin cured product sample was prepared using the photocurable resin composition of Example 1. On an electron micrograph of a cross section of the sample, the phase separation structure being a sea-island structure was analyzed, using an image analysis software A-Image-Kun (produced by Asahi Kasei Engineering Corporation), to determine an average particle diameter of the islands (dispersed phases).

The evaluation results of Examples and Comparative Examples are shown in Table 3B. The components used in Examples and Comparative Examples are shown in Table 3A.

pTABLE 2A

| First reactive compound | First reactive oligomer | CN983NS | Arkema S.A. | A urethane acrylate oligomer |
|---|---|---|---|---|
| | | CN9893NS | Arkema S.A. | A urethane acrylate oligomer |
| | | EBE8811 | Daicel-Allnex Ltd. | A urethane acrylate oligomer |
| | First reactive monomer | ACMO | KJ Chemicals Corporation | Acryloylmorpholine |
| | | NVPY | Tokyo Chemical Industry Co., Ltd. | N-vinylpyrrolidone |
| | | SR203 | Arkema S.A. | Tetrahydrofurfuryl methacrylate |
| | | SR506 | Arkema S.A. | Isobornyl acrylate |
| Second reactive compound | Second reactive oligomer | EBE270 | Daicel-Allnex Ltd. | A urethane acrylate oligomer |
| | | CN966 | Arkema S.A. | A urethane acrylate oligomer |

TABLE 2B

| | | | Tg | HSP | | |
|---|---|---|---|---|---|---|
| | | | ° C. | dD | dP | dH |
| First reactive compound | First reactive oligomer | CN983NS | 92 | 13.9 | 18.1 | 8.9 |
| | | CN9893NS | 13 | 23.9 | 12.1 | 13.7 |
| | | EBE8811 | 44 | 16.8 | 5.0 | 14.6 |
| | First reactive monomer | ACMO | 140 | 18.6 | 11.5 | 6.5 |
| | | NVPY | 86 | 18.6 | 11.0 | 5.0 |
| | | SR203 | 23 | 16.8 | 5.2 | 5.7 |
| | | SR506 | 88 | 16.2 | 5.3 | 6.2 |
| Second reactive compound | Second reactive oligomer | EBE270 | −27 | 15.5 | 5.9 | 13.1 |
| | | CN966 | −60 | 18.4 | 6.8 | 11.7 |

TABLE 3A

| | First reactive compound | | Second reactive compound | Mass ratio | | | | HPS | | | | | |
|---|---|---|---|---|---|---|---|---|---|---|---|---|---|
| | First reactive monomer | First reactive oligomer | Second reactive oligomer | | | | | First reactive compound | | | Second reactive compound | | |
| | (1a) | (1b) | (1c) | (2a) | (1a) | (1b) | (1c) | (2a) | dD | dP | dH | dD | dP | dH |
| Ex. 1 | ACMO | SR506 | CN983NS | EBE270 | 25 | 30 | 20 | 25 | 16.4 | 10.8 | 7.0 | 15.5 | 5.9 | 13.1 |
| Ex. 2 | NVPY | SR506 | CN983NS | EBE270 | 25 | 30 | 20 | 25 | 16.4 | 10.6 | 6.5 | 15.5 | 5.9 | 13.1 |
| Ex. 3 | ACMO | | CN983NS | CN966 | 35 | 35 | 10 | 20 | 17.0 | 9.6 | 6.7 | 18.4 | 6.8 | 11.7 |
| Ex. 4 | | | CN9893NS | CN966 | 40 | 35 | 5 | 20 | 17.9 | 8.8 | 6.8 | 18.4 | 6.8 | 11.7 |
| Ex. 5 | NVPY | | CN983NS | CN966 | 35 | 35 | 10 | 20 | 17.0 | 10.3 | 6.0 | 18.4 | 6.8 | 11.7 |
| Ex. 6 | | | CN9893NS | CN966 | 40 | 35 | 5 | 20 | 17.9 | 9.6 | 6.1 | 18.4 | 6.8 | 11.7 |

TABLE 3A-continued

| | First reactive compound | | | Second reactive compound | Mass ratio | | | | HPS | | | | | |
| | | | | | | | | | First reactive compound | | | Second reactive compound | | |
| | First reactive monomer | First reactive oligomer | | Second reactive oligomer | | | | | | | | | | |
| | (1a) | (1b) | (1c) | (2a) | (1a) | (1b) | (1c) | (2a) | dD | dP | dH | dD | dP | dH |
|---|---|---|---|---|---|---|---|---|---|---|---|---|---|---|
| Com. Ex. 1 | ACMO | | EBE8811 | EBE270 | 30 | 25 | 30 | 15 | 17.2 | 7.4 | 9.3 | 15.5 | 5.9 | 13.1 |
| Com. Ex. 2 | NVPY | | | | 30 | 25 | 30 | 15 | 17.2 | 7.2 | 8.7 | 15.5 | 5.9 | 13.1 |
| Com. Ex. 3 | SR203 | | | | 30 | 25 | 30 | 15 | 16.6 | 5.2 | 9.0 | 15.5 | 5.9 | 13.1 |

TABLE 3B

| | First reactive compound | | | Second reactive compound | Difference in HSP | | | Viscosity of composition mPa·s | | Izod impact strength | Tg | Shore D hardness | Appearance |
| | First reactive monomer | First reactive oligomer | | Second reactive oligomer | | | | | | | | | |
| | (1a) | (1b) | (1c) | (2a) | dD | dP | dH | (25° C.) | (50° C.) | J/m | ° C. | | |
|---|---|---|---|---|---|---|---|---|---|---|---|---|---|
| Ex. 1 | ACMO | SR506 | CN983NS | EBE270 | 0.8 | 4.9 | 6.1 | 155 | 49 | 241 | −27 | 74 | 69 yellowish turbid |
| Ex. 2 | NVPY | | | | 0.8 | 4.7 | 6.6 | 155 | 49 | 220 | −27 | 74 | 69 yellowish turbid |
| Ex. 3 | ACMO | | | CN966 | 1.4 | 2.8 | 5.0 | 240 | 63 | 213 | −60 | 96 | 72 yellowish turbid |
| Ex. 4 | | | CN9893NS | | 0.5 | 2.0 | 4.9 | 160 | 50 | 112 | −60 | 106 | 74 yellowish turbid |
| Ex. 5 | NVPY | | CN983NS | | 1.4 | 3.5 | 5.7 | 205 | 63 | 205 | −60 | 96 | 72 yellowish turbid |
| Ex. 6 | | | CN9893NS | | 0.5 | 2.8 | 5.6 | 162 | 50 | 130 | −60 | 106 | 74 yellowish turbid |
| Com. Ex. 1 | ACMO | | EBE8811 | EBE270 | 1.7 | 1.5 | 3.8 | 225 | 65 | 35 | −27 | 79 | 78 transparent |
| Com. Ex. 2 | NVPY | | | | 1.7 | 1.3 | 4.3 | 291 | 76 | 50 | −27 | 77 | 72 transparent |
| Com. Ex. 3 | SR203 | | | | 1.1 | 0.7 | 4.1 | 283 | 74 | 15 | −27 | 65 | 70 transparent |

As shown in Tables 3A and 3B, in Comparative Examples, in which the difference between the polar term $dP_1$ of the HSP of the first reactive compound and the polar term $dP_2$ of the HSP of the second reactive compound was less than 1.8, although the Shore D hardness was high, the Izod impact strength was 50 J/m or less. In contrast, in Examples, in which the difference between the polarity term $dP_1$ and the polar term $dP_2$ was 1.8 or more, while high Shore D hardness was ensured, the Izod impact strength exceeding 100 J/m was obtained, which was remarkably high as compared to those in Comparative Examples. In Examples, while high Izod impact strength was ensured, the Tg of the glass layer as high as 70° C. or higher was obtained. High Izod impact strength (toughness) and high Tg or Shore D hardness were achieved at the same time in Examples, presumably because the phase separation structure of a rubber phase and a glass phase was formed in an optimized state while the curing reaction proceeded in the uniform liquid photocurable resin composition. This also can be inferred from the result that the resin cured products of Examples were yellowish turbid in appearance. In Examples, the rubber phase grew as the curing reaction proceeded, and the phase separation structure of the rubber phase and the glass phase was optimized, which presumably resulted in a yellowish turbid, not transparent, state. In contrast, in Comparative Examples, the growth of the separation phase was insufficient, failing to form an optimized phase separation structure. Furthermore, the photocurable resin compositions of Examples had a viscosity at 25° C. of as low as 250 mPa or less, and were in a liquid state. The photocurable resin compositions of Examples all had a viscosity at 50° C. of 100 mPa·s or less, showing that they are suitably applicable for inkjet-type optical shaping.

Figure 2:
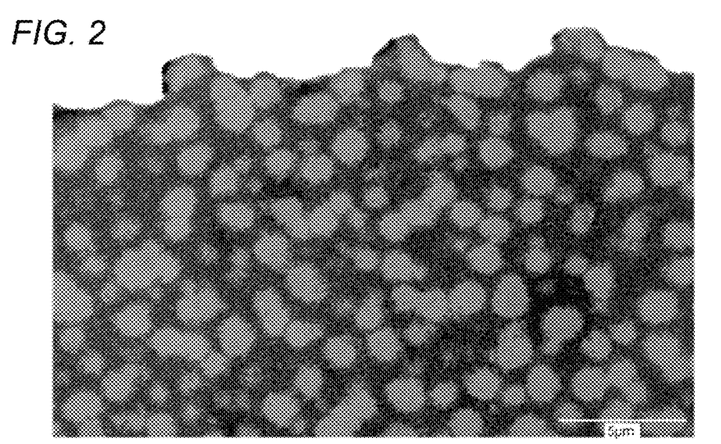
FIG. 2 A electron micrograph of a resin cured product of Example 1.
Figure 3:
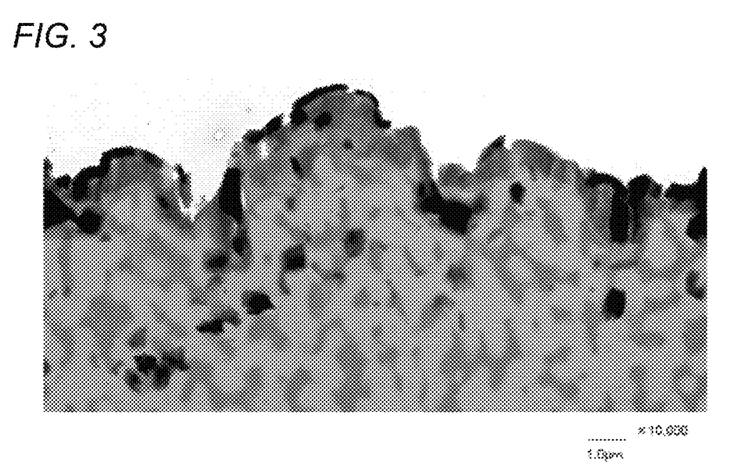
FIG. 3 A electron micrograph of a resin cured product of Example 4.

FIG. 2 shows an electron micrograph of the resin cured product of Example 1. FIG. 3 shows an electron micrograph of the resin cured product of Example 4. In FIG. 2, the phase separation structure being a sea-island structure was observed, and the average particle diameter of the rubber phases serving as the dispersed phases was 1.2 μm, which was much larger than the particle diameter of nano-size dispersed phases that are considered to impart high toughness to an alloy or blend of thermoplastic resin. This indicates that the toughness improving mechanism is different from that in a thermoplastic resin. In FIG. 3, the phase separation structure being a co-continuous phase structure was observed. This shows that in this case, too, both high toughness and high strength can be achieved. Here, the dispersed phases were identified as rubber phases, from elastic modulus mapping images obtained by atomic force microscopy (AFM).

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

INDUSTRIAL APPLICABILITY

The photocurable resin composition according to the above aspect of the present invention can provide a resin cured product with high strength and high toughness, and therefore, is suitably applicable for optical shaping, as a material for forming a two- or three-dimensional shaped-object (e.g., an artificial organ or tissue, a figure). It is to be noted, however, these applications are mere examples. The applications of the photocurable resin composition or a resin cured product thereof are not limited to these examples.

REFERENCE SIGNS LIST

1: optical shaping apparatus, 2: platform, 2a: pattern forming surface, 3: resin tank, 4: projector, 5: photocurable resin composition, 6: mold-releasing agent layer, 7a: liquid film a, 7b: liquid film b, 8a: two-dimensional pattern a, 8b: two-dimensional pattern b, L: light

The invention claimed is:

1. A photocurable resin composition in a liquid state, comprising:
   a first reactive compound that forms a glass phase through curing;
   a second reactive compound that is compatible with the first reactive compound and forms a rubber phase through curing; and
   a photopolymerization initiator; and
   wherein:
   the first reactive compound includes at least a reactive monomer and a first reactive oligomer,
   the second reactive compound includes at least a second reactive oligomer, and
   a polar term $dP_1$ of Hansen Solubility Parameter of the first reactive compound and a polar term $dP_2$ of Hansen Solubility Parameter of the second reactive compound differ by 1.8 or more.

2. The photocurable resin composition according to claim 1, wherein the reactive monomer includes at least a monofunctional reactive monomer.

3. The photocurable resin composition according to claim 1, wherein the polar term $dP_1$ and the polar term $dP_2$ differ by 1.8 or more and 10 or less.

4. The photocurable resin composition according to claim 1, wherein
   the first reactive compound has at least a (meth)acryloyl group, and
   the second reactive compound has at least a (meth)acryloyl group.

5. The photocurable resin composition according to claim 1, having a viscosity at 50° C. of 100 mPa's or less.

6. The photocurable resin composition according to claim 1, wherein the glass phase and the rubber phase form at least one kind of phase separation structure selected from the group consisting of a sea-island structure and a co-continuous phase structure.

7. A photocurable resin composition in a liquid state, comprising:
   a first reactive compound that forms a glass phase through curing;
   a second reactive compound that is compatible with the first reactive compound and forms a rubber phase through curing; and
   a photopolymerization initiator;
   wherein:
   the first reactive compound includes at least a reactive monomer,
   the second reactive compound includes at least a second reactive oligomer,
   a polar term $dP_1$ of Hansen Solubility Parameter of the first reactive compound and a polar term $dP_2$ of Hansen Solubility Parameter of the second reactive compound differ by 1.8 or more; and
   in a resin cured product obtained from the photocurable resin composition;
   an Izod impact strength as measured in accordance with ASTM D256 is 100 J/m or more, and
   the glass phase has a glass transition point of 70° C. or higher.

8. A photocurable resin composition in a liquid state, comprising:
   a first reactive compound that forms a glass phase through curing;
   a second reactive compound that is compatible with the first reactive compound and forms a rubber phase through curing; and
   a photopolymerization initiator;
   wherein:
   the first reactive compound includes at least a reactive monomer,
   the second reactive compound includes at least a second reactive oligomer,
   a polar term $dP_1$ of Hansen Solubility Parameter of the first reactive compound and a polar term $dP_2$ of Hansen Solubility Parameter of the second reactive compound differ by 1.8 or more; and
   a resin cured product obtained from the photocurable resin composition has a Shore D hardness of 65 or more.

9. A resin cured product obtained by photocuring the photocurable resin composition according to claim 1.

10. The photocurable resin composition according to claim 1, wherein the first reactive oligomer includes a (meth)acrylate of a non-aromatic polyol.

11. The photocurable resin composition according to claim 1, wherein the first reactive oligomer includes at least one selected from the group consisting of a (meth)acrylate of a polyurethane polyol, a (meth)acrylate of a polyesterurethane polyol, and a (meth)acrylate of a polyetherurethane polyol.

12. The photocurable resin composition according to claim 1, wherein a polar term of Hansen Solubility Parameter of the first reactive oligomer is 10 or more and 25 or less.

13. The photocurable resin composition according to claim 1, wherein
   the first reactive oligomer has a weight average molecular weight of 500 or more and less than 5,000,
   the second reactive oligomer has a weight average molecular weight of 500 or more and less than 5,000.

14. The photocurable resin composition according to claim 1, wherein the polar term $dP_1$ and the polar term $dP_2$ differ by 2.0 or more.

15. A photocurable resin composition in a liquid state, comprising:
   a first reactive compound that forms a glass phase through curing;

a second reactive compound that is compatible with the first reactive compound and forms a rubber phase through curing; and a photopolymerization initiator;

wherein:

the first reactive compound includes at least a reactive monomer, the second reactive compound includes at least a second reactive oligomer, a polar term $dP_1$ of Hansen Solubility Parameter of the first reactive compound and a polar term $dP_2$ of Hansen Solubility Parameter of the second reactive compound differ by 1.8 or more; and a hydrogen bond term $dH_1$ of Hansen Solubility Parameter of the first reactive compound and a hydrogen bond term $dH_2$ of Hansen Solubility Parameter of the second reactive compound differ by 4.5 or more and 15 or less.

* * * * *